United States Patent [19]

Oberschmid et al.

[11] Patent Number: 4,508,966

[45] Date of Patent: Apr. 2, 1985

[54] RECORDING AND READOUT APPARATUS FOR X-RAYS

[75] Inventors: Raimund Oberschmid, Munich; Ingmar Feigt, Langensendelbach, both of Fed. Rep. of Germany

[73] Assignee: Siemens Aktiengesellschaft, Berlin & Munich, Fed. Rep. of Germany

[21] Appl. No.: 524,437

[22] Filed: Aug. 18, 1983

[30] Foreign Application Priority Data

Sep. 22, 1982 [DE] Fed. Rep. of Germany ....... 3235076

[51] Int. Cl.³ ............................................. G03C 5/16
[52] U.S. Cl. .............................. 250/327.2; 250/484.1
[58] Field of Search ............ 250/327.2, 361 R, 370 R, 250/483.1, 484.1; 430/84

[56] References Cited

U.S. PATENT DOCUMENTS

| | | | |
|---|---|---|---|
| 4,227,084 | 10/1980 | Thomann et al. | 250/370 |
| 4,254,200 | 3/1981 | Thomann et al. | 430/84 |
| 4,279,772 | 7/1981 | Takagi et al. | 250/483.1 |

FOREIGN PATENT DOCUMENTS 2007457  5/1979  United Kingdom ................ 250/367

Primary Examiner—Janice A. Howell
Attorney, Agent, or Firm—Hill, Van Santen, Steadman & Simpson

[57] ABSTRACT

A recording and readout apparatus for X-rays has a storage layer whose charge distribution which is generated and stored by means of x-radiation during the recording is read out light-optically in point-by-point fashion. An image data storage of the readout may be provided along with a display apparatus for image observation.

7 Claims, 3 Drawing Figures

RECORDING AND READOUT APPARATUS FOR X-RAYS

BACKGROUND OF THE INVENTION

The present invention relates to a recording and readout apparatus for X-rays.

From U.S. Pat. Nos. 4,227,084 and 4,254,200, incorporated herein by reference, an apparatus is known with which, according to the principle of xerography, or charge image copy, electrostatic images of X-ray "photographs" can be produced. As radiosensitive material a crystalline bismuth oxide compound of the composition $Bi_{10-14}X_1O_n$ is employed therein, in which X stands for one of the elements germanium, silicon, titanium, gallium, and aluminum, and n is a number which indicates the essentially stoichiometrically measured oxygen concentration of the compound. This bismuth oxide compound has a very high X-ray absorption, and, in small layer thickness of only 0.3 mm, for example, is suitable for the recording of an X-ray image. The material has the property of storing for a long period of time in said material the electric polarization generated by incided and absorbed x-radiation if the material is not subject to any exposure. A bismuth oxide compound of this typs is also a photoconductor with dar, resistances on the order of magnitude of $10^{13}$ to $10^{17}$ ohm.cm.

SUMMARY OF THE INVENTION

It is an object of the present invention to disclose an apparatus with which X-ray images can be evaluated in such a fashion that the information of the X-ray image can be obtained and converted into electrical signals.

This objective is achieved by providing a layer means comprising a $bismuth_{12}$ oxide compound in which, given an applied external electric field in association with the layer means, by use of incident X-rays an electric charge distribution corresponding to a respective X-ray image is generated and stored in the layer means. A light ray generating and scanning means for a point-by-point readout of the stored charge distribution is provided and which scans the layer means in a point-by-point fashion. The layer means has generated therein electric photoconduction by exposure to the light ray. Opposite surfaces of the layer means are each covered with an electrode. At least one of the electrodes is electrically insulated by an insulating layer from the layer means. Means are provided for connecting the electrodes during readout operation to an amplifier and during recording to an electric field source.

The consideration underlying the present invention is to utilize both the radiosensitive as well as photosensitive property of the bismuth oxide compounds in combination. A further development of the invention is to optimize the bismuth oxide compound to be employed for the invention such that the most favorable X-ray sensitivity as well as the most favorable photosensitivity for the inventive apparatus is present. It was ascertained that a layer of a mixed crystal material of $Bi_{12}GeO_{20}$ and $Bi_{12}SiO_{20}$ is particularly suited for this purpose. $Bi_{12}SiO_{20}$, as compared with $Bi_{12}GeO_{20}$, has an approximately two to three times higher light absorption and photosensitivity in the wavelength range >420 nm, whereas the $Bi_{12}GeO_{20}$ has the approximately theoretically maximum possible X-ray charge sensitivity. Given a broad wavelength range of between 420 and 600 nm, $Bi_{12}GeO_{20}$ has an absorption constant which is neither too large for volume excitation nor too small in order to effect light absorption.

A $Be_{12}GeO_{20}$ layer provided with contacts has, even without a special insulating layer, a radiation-induced polarization which can exceed the lattice polarization by orders of magnitude and which, after a "short circuit" in the material brought about by exposure, effects a strong reverse current in the exterior current circuit. The material-inherent discharge time constant of this radiation-induced DC current polarization is advantageously very large and lasts (depending upon a pre-exposure) up to several days.

DESCRIPTION OF THE PREFERRED EMBODIMENTS

Figure 1:
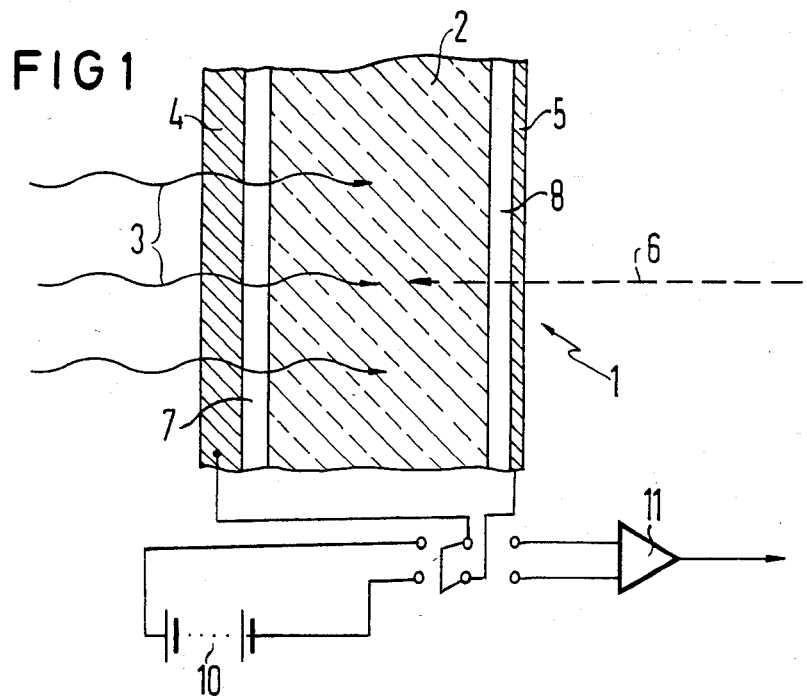
FIG. 1 shows an X-ray photograph and memory layer with its electric wiring for an apparatus according to the invention.

In FIG. 1, a section of an X-ray recording and memory layer 1 employed for an inventive apparatus with an additional photoresistive readout effect is indicated. The material of the layer 2 is preferably $Bi_{12}(Ge, Si)O_{20}$; for example a germanium-silicon-mixed crystal material of a $bismuth_{12}$ compound. The layer has a thickness of preferably 0.1 to 1 mm, whereby it is favorably dimensioned for x-radiation absorption, on the one hand, and for readout with light, on the other hand. A thickness value of 0.3 mm is optimum. On the side of layer 2 facing the incident x-radiation 3, an electrode 4 is present which merely must have the property of exhibiting relatively low x-radiation absorption. For example, for such an electrode, a thin vapor-deposition layer of aluminum is suitable. On the opposite side of the layer an electrode 5 which is light transmissive with respect to the light 6 which is to be radiated in, and which consists of indium-doped tin oxide, for example, is present. FIG. 1 shows insulating layers 7 and 8 which are disposed between the electrode 4 and the layer 2 or between the electrode 5 and the layer 2. Preferably, such an insulating layer 7 or 8 is provided as a blocking layer at least between one of the two electrodes 4 or 5 and the layer 2. For the purpose of X-ray image recording, an electric field is produced between the electrodes 4 and 5 by applying 300 to 3000 volts from voltage source 10 via a switch 9.

With the incident x-radiation 3 there takes place in the material of the layer 2 a radiation induced polarization whose magnitude is dependent upon the X-ray intensity. The layer 2 can record and store the X-ray image of a subject as a generated polarization distribution in the layer material. If now with the aid of the readout radiation 6 the layer is scanned in point-by-point fashion over the surface over which the electrode 5 extends, then photoconduction is generated through the light in the material of the layer 2. This photoconduction creates a type of short circuit in the material of the layer which leads to the reverse flow of the polarization charges if the electrodes 4 and 5 are connected with a low input resistance via a current amplifier 11.

Preferably during the readout the electric field is disconnected by means of the direct connection or voltage source bypass position of the switch 9 so that only the polarization generated by the x-radiation delivers a signal at the output of the current amplifier 11.

The electric signals occurring successively in chronological sequence corresponding to the point-by-point scanning of the surface of the layer, are an equivalent to the previous surface polarization distribution in the layer 2. One thus obtains the video signal of the X-ray image.

For the material of the layer 2 the compound $Bi_{12}SiO_{20}$ is particularly favorable.

In an apparatus of the invention, an image surface of 1000 cm² for example is provided which can be read out in only 10 seconds given a read-light efficiency with an order of magnitude of 100 mW at 633 nm, of 10 mW at 515 nm, and 1 mW at 420 nm. Charge carrier transit times which in the case of opaque photoconductors limit the readout time in known manner, need not be taken into consideration here.

In contrast to German AS No. 10 78 608 incorporated herein by reference, with the invention the X-ray photoconductor and the light photoconductor are identical. At least the one insulating layer can be kept very thin with the capacitances $C_I > C_F$ (preferably $C_I \approx 4$ times $C_F$ can be provided) so that a large portion of the X-ray induced polarization charge $Q_r$ flows back in the exterior measuring circuit. $C_F$ is here the capacitance of the light and X-ray photoconductive layer 2, and $C_I$ is the capacitance of the series connection of the insulating layers 7 and 8.

Figure 2:
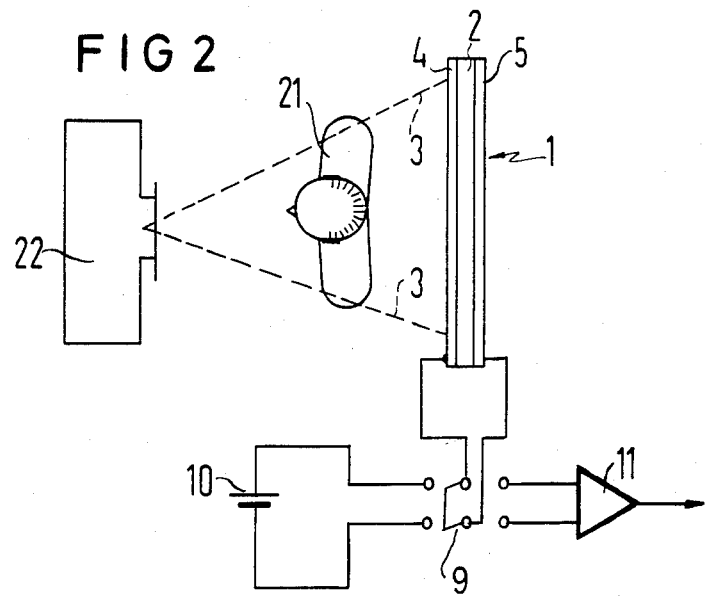
FIG. 2 shows an inventive apparatus together with the electronics necessary for the photographic recording.

FIG. 2 shows an X-ray recording and memory layer 1 according to FIG. 1 in an apparatus according to the invention, and the parts are shown which are necessary for X-ray image recording. The layer 1 is, for example, contained in a cassette with the necessary electrical connections.

A subject 21 shown in the drawing figure is an individual of whom an X-ray image is to be taken. X-ray source 22 is also shown. As in FIG. 1, also in FIG. 2 the X-radiation is referenced 3. It generates a shadow image of the subject 21 in the material of the layer 2 in the form of a corresponding polarization distribution. The electrical wiring shown in FIG. 2 corresponds to the recording operation.

Figure 3:
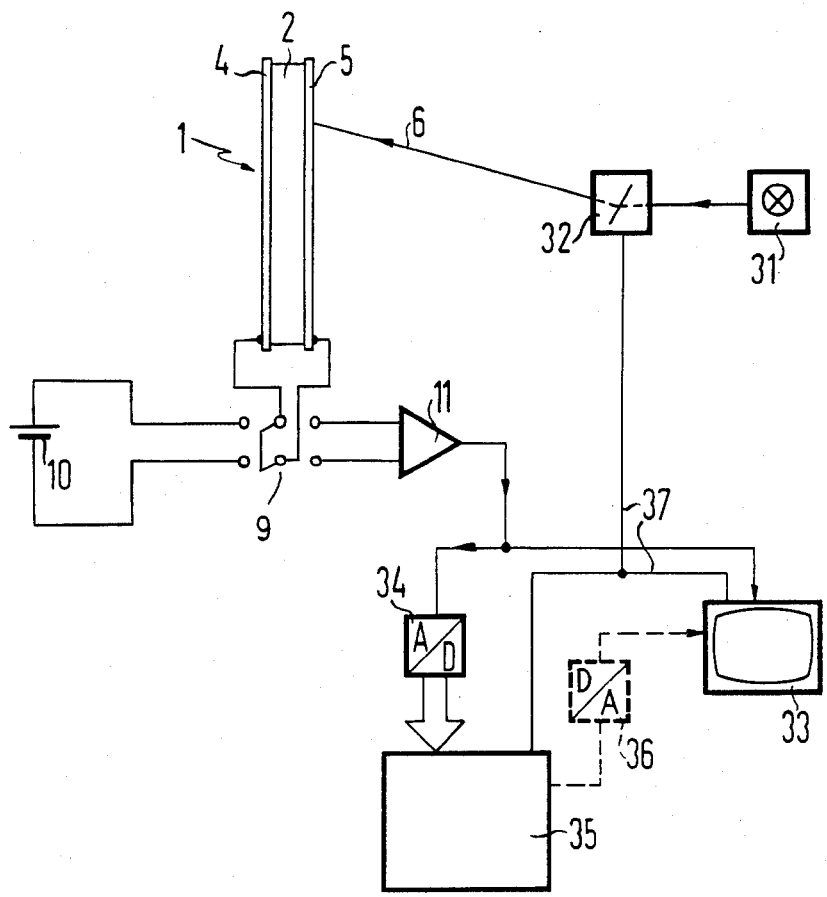
FIG. 3 shows an inventive apparatus with the parts necessary for the display.

FIG. 3 shows the part of the apparatus of the invention which is to be employed for tne readout or tne image-storing layer 1. The parts of FIGS. 2 and 3 can be united in one apparatus. However, it can also be provided that the layer 1 contained in the cassette may be read out in another separate readout apparatus.

As in FIG. 1, 6 designates the scanning light ray which emanates from a light source 31 and is deflected with the aid of an optical deflection unit 32 in such a fashion that with the light ray all image points of the layer 1 or of the layer 2 can be detected. The electrical wiring indicated in FIG. 3 corresponds to the readout operation. The readout signal to be obtained from the readout amplifier 11 can on the one hand be directly supplied to a viewing screen apparatus for the direct optical readout. The readout signal can, however, also be supplied via an analog-to-digital converter to an apparatus 35 for digital image data processing and storage with which a later image readout can take place on the viewing screen apparatus 33 via a digital-to-analog converter 36. Lines 37 for control signals are provided between the electronic readout apparatus 33, 35, and the optical deflection unit 32.

Although various minor changes and modifications might be proposed by those skilled in the art, it will be understood that we wish to include within the claims of the patent warranted hereon all such changes and modifications as reasonably come within our contribution to the art.

We claim as our invention:

1. A recording and readout apparatus for X-rays, comprising: a layer means comprising a Bismuth$_{12}$ Oxide compound in which, given an applied external electric field in association with the layer means, by use of incident X-rays, an electric charge distribution corresponding to a respective X-ray image is generated and stored in the layer means; a light ray generating and scanning means for a point-by-point readout of the stored charge distribution by scanning the layer means in a point-by-point fashion; said layer means having generated therein electric photoconduction by exposure to said light ray; and opposite surfaces of the layer means each being covered with an electrode, at least one of the electrodes being electrically insulated by an insulating layer from the layer means; and means for connecting said electrodes during readout operations to a current-amplifier with low input-impedance and during recording to an electric field source.

2. An apparatus according to claim 1 wherein the layer means is comprised of a material of the type $Bi_{12}(Ge,Si)O_{20}$.

3. An apparatus according to claim 2 wherein the layer means is comprised of $Bi_{12}SiO_{20}$.

4. An apparatus according to claim 1 wherein a digital image data processing and storage means connects to an output of the amplifier.

5. An apparatus according to claim 1 wherein the amplifier consists of a sensitive current amplifier with a low input resistance.

6. An apparatus according to claim 1 wherein the layer means is comprised of a layer of a mixed crystal material of $Bi_{12}GeO_{20}$ and $Bi_{12}SiO_{20}$.

7. A recording and readout apparatus for X-rays, comprising: a layer means comprising a Bismuth$_{12}$ Oxide compound; electrodes on opposite faces of the layer means, at least one of the electrodes being insulated from the layer means; means for applying an electrical potential to the electrodes to create an electrical field at the layer means during recording of X-rays and for applying a sensing amplifier to the electrodes during readout; light ray generating and scanning means for a point-by-point readout of a charge distribution which is stored in the layer means as a result of incident X-rays; and the layer means being designed so that it will retain the electric charge distribution therein created by the incident X-rays and which will generate electric photoconduction when exposed to the light ray.

* * * * *